L. B. DOE.
REACH.
APPLICATION FILED SEPT. 22, 1920.
1,414,343.
Patented May 2, 1922.
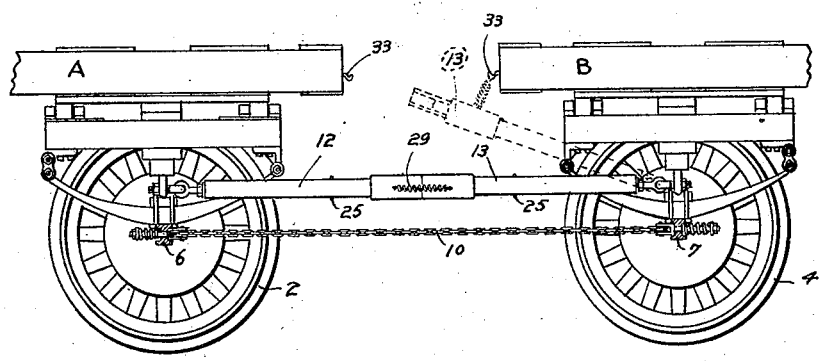
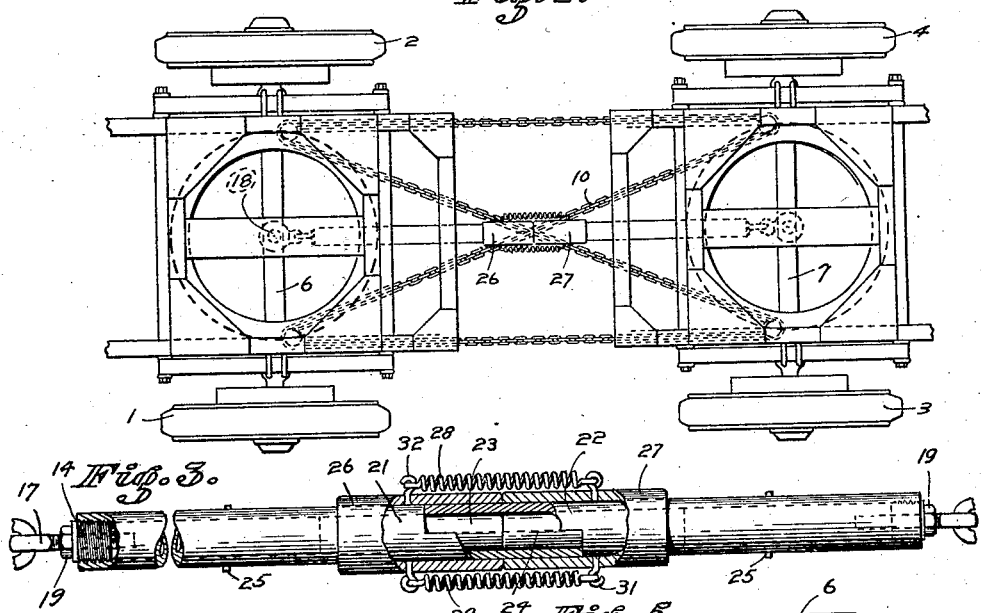
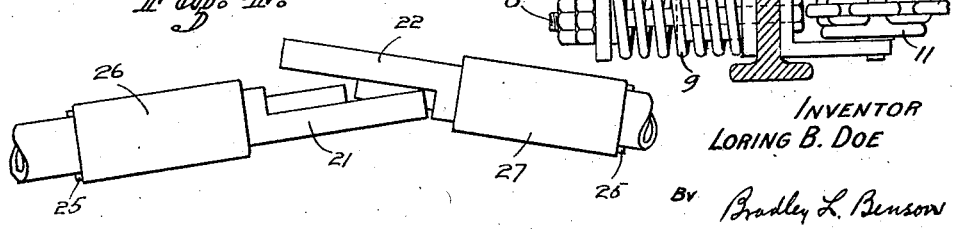
INVENTOR
LORING B. DOE
BY Bradley L. Benson
ATTORNEY.

UNITED STATES PATENT OFFICE.

LORING B. DOE, OF SAN FRANCISCO, CALIFORNIA.

REACH.

1,414,343.

Specification of Letters Patent.  Patented May 2, 1922.

Application filed September 22, 1920. Serial No. 412,083.

*To all whom it may concern:*

Be it known that LORING B. DOE, a citizen of the United States of America, residing at San Francisco, in the county of San Francisco and State of California, has invented certain new and useful Improvements in Reaches, of which the following is a specification.

The present invention is an improved reach for connecting vehicles such as trailers in a train of two or more.

The principal object of the invention is to provide a reach adapted to connect two or more vehicles composed of a non-rigid draft appliance and a rigid separating device extending from axle to axle which will be easily and quickly separable at a point substantially in the middle of its length and when so separated the parts thereof will serve as tongues and will be easily secured to the vehicles for ready re-connection.

Another object is to provide a separable reach with a joint so constructed that the separable members will act as a lever to apply spreading force between the axles to put the draft means between the vehicles under a working tension.

In this specification and the annexed drawings, the invention is illustrated in the form considered to be the best, but it is to be understood that the invention is not limited to such form, because it may be embodied in other forms and it is also to be understood that in and by the claims following the description it is desired to cover the invention in whatever form it may be embodied.

In the accompanying one sheet of drawings Figure 1 is a vertical section on the line I—I of Figure 2.

Figure 2 is a plan view of my device corresponding with Figure 1, the device being shown between two vehicles which are here shown in fragmentary form, the front portion of one and the rear of the other being shown.

Figure 3 is an enlarged detail view of my reach.

Figure 4 is a detail showing the method of attaching my separable reach.

Figure 5 is an enlarged detail.

Referring to the drawings the letter A refers to the rear end of a vehicle as a whole and the letter B to the front end of an adjacent similar vehicle as a whole.

Obviously these vehicles may be of either two wheeled or four wheeled type and are here shown diagrammatically for the purpose of illustrating the adaptation thereto of my improved reach spreader and its relation to the draft means.

The numerals 1 and 2 indicate the rear wheels of vehicle A and 3 and 4 the forward wheels of vehicle B, journalled on axles 6 and 7 respectively.

Extending through both axles 6 and 7 in two places are bolts 8, slidable freely through said axles and normally held in the relative position thereto shown in Figure 5 by expansion springs 9.

The purpose of these bolts is to carry chain sheaves 11 around and through which is rove an endless chain draft means 10 of figure 8 form fully described in my co-pending application filed in the United States Patent Office on April 20th, 1920, and bearing Serial Number 375,398.

The purpose of the springs 9 is to keep the endless draft means under tension during draft.

The numerals 12 and 13 indicate the separable halves of a composite spreader bar, adapted to separate vehicles A and B at the point of gyration of the axles 6 and 7. Each end of the composite bar is provided with a universal joint connection with the vehicle to which it is attached. This may be a ball joint or a simple eye bolt construction here shown.

The members 12 and 13 are here shown as made of tubular material for lightness and strength and are tapped at one end for plugs 14 into which engage eyes 17 swivelled in a king bolt 18 thus forming a universal joint of simple form. The bar may be lengthened or shortened by screwing the eyebolt 16 to the desired length and secured by a nut 19.

The ends of the members 12 and 13 remote from the eyebolts 16 are cut away to form a half and half joint as shown in Figure 4 in which the overlapping halves of the members are numbered 21 and 22.

The tubular members 12 and 13 are plugged by rods 23 and 24 which, when the separator bar is assembled as shown in Figures 1, 2 and 3, abut each other. In order to hold the entire device in rigid form, I provide sleeves 26 and 27, slidable on the members 12 and 13 respectively for a distance limited by pins 25. These sleeves have two functions. When assembled as shown in Figure 3 and held together by springs 28 and 29, they keep the bar from collapsing as shown in Figure 4 which is possible when the sleeves 26 and 27 are retracted after releasing at one end the springs 28 and 29 from hooks 31 and 32 on sleeves 26 and 27.

When the sleeves are so retracted and the device collapsed the springs serve to secure each half of the bar to hooks 33 on the frame or superstructure 34 in inoperative position shown in dotted lines in Figure 1.

The operation of my device is as follows:

Assuming the halves of the bar to be shipped in inoperative position shown in dotted lines in Figure 1, they are unhooked and placed in the relative positions shown in Figure 4 with the ends of plugs 23 and 24 abutting in angular position. The device is now straightened to the position shown in Figure 3. This exerts a spreading force adapted to take up the slack in the chain draft device (previously attached) and compress springs 9. The sleeves 26 and 27 are slid together and secured by connecting springs 28 and 29 to hooks 32 and 31 respectively.

Having thus described my invention what I claim as new and desire to secure by Letters Patent of the United States is:

1. A reach for connecting two vehicles composed of a flexible draft means, and a rigid separator means, the latter comprising two members adapted to overlap each other at their meeting ends for a portion of their length, sleeves slidable on said members and adapted to ensleeve said overlapping portions, and means for securing said sleeves together to stabilize the device.

2. A composite reach for connecting vehicles comprising two members each provided at one end with a universal joint for connection with said vehicles and arranged at the opposite ends to overlap each other, sleeves slidable on said members over said overlap and resilient means for connecting said sleeves together.

3. A composite reach for connecting vehicles comprising two members each provided at one end with a universal joint for connection with said vehicles and arranged at the opposite ends to overlap each other, sleeves slidable on said members over said overlap, springs secured at one end to one of said sleeves and provided at the opposite end with means for engaging the other of said sleeves.

4. A composite reach composed of two members each provided with a universal joint at one end for connection with a vehicle, and each adapted to abut the other at the end opposite said joint at an obtuse angle and when straightened to exert a spreading force between said vehicles and means for securing said ends so abutted against collapse.

5. A reach for connecting vehicles comprising two members adapted to overlap each other for a portion of their length, sleeves slidable on said members, and means for securing said sleeves together over said overlapping portions, to stabilize the reach, and means for extending the length of each of said members.

In testimony whereof I affix my signature.

LORING B. DOE.